US006888464B1

(12) United States Patent
Maloney

(10) Patent No.: US 6,888,464 B1
(45) Date of Patent: May 3, 2005

(54) CHILD LOCATING SYSTEM

(76) Inventor: Cathy Maloney, 790 Lincoln #113, Napa, CA (US) 94558

( * ) Notice: Subject to any disclaimer, the term of this patent is extended or adjusted under 35 U.S.C. 154(b) by 22 days.

(21) Appl. No.: 10/126,891

(22) Filed: Apr. 19, 2002

(51) Int. Cl.[7] ............................ G08B 1/08; H04Q 7/00

(52) U.S. Cl. ............................ 340/573.1; 340/539.1; 340/539.11; 340/539.13; 340/539.15; 607/30

(58) Field of Search ......................... 340/539.1, 539.11, 340/539.13, 539.15, 573.1, 572.8, 572.9, 573.7, 573.4, 988 T; 607/30, 27, 32; 600/301; 128/899

(56) References Cited

U.S. PATENT DOCUMENTS

| | | | | | |
|---|---|---|---|---|---|
| 4,177,800 | A | | 12/1979 | Enger | |
| 4,532,932 | A | | 8/1985 | Batty, Jr. | |
| 4,706,689 | A | | 11/1987 | Man | |
| 4,764,111 | A | | 8/1988 | Knierim | |
| 4,793,825 | A | | 12/1988 | Benjamin et al. | |
| 4,865,044 | A | | 9/1989 | Wallace et al. | |
| 4,899,135 | A | | 2/1990 | Ghahariiran | |
| 5,074,318 | A | | 12/1991 | Campbell et al. | |
| 5,217,011 | A | | 6/1993 | Bisch | |
| 5,461,365 | A | | 10/1995 | Schlager et al. | |
| 5,629,678 | A | | 5/1997 | Gargano et al. | |
| 5,760,692 | A | * | 6/1998 | Block | 340/573.1 |
| 5,900,817 | A | * | 5/1999 | Olmassakian | 340/573.1 |
| 5,949,350 | A | * | 9/1999 | Girard et al. | 340/825.49 |
| 6,031,460 | A | * | 2/2000 | Banks | 340/573.1 |
| 6,239,705 | B1 | * | 5/2001 | Glen | 340/573.1 |
| 6,317,049 | B1 | * | 11/2001 | Toubia et al. | 340/573.4 |
| 6,579,231 | B1 | * | 6/2003 | Phipps | 600/300 |

OTHER PUBLICATIONS

"Digital Angel Unveiled" Nov. 1, 2000; WorldNetDaily; www.worldnetdaily.com/news/article.asp?ARTICLE_ID=17705.*

John Markus and Neil Sclater, "McGraw–Hill Electronics Dictionary," 5th ed., McGraw–Hill, Inc, (United States of America), p. 3, (Apr. 5, 1994).

* cited by examiner

*Primary Examiner*—Jeffrey Hofsass
*Assistant Examiner*—Lam Pham

(57) ABSTRACT

A child locating system for detecting if a person, such as a child, is outside of a predetermined radius from a receiving point and for determining the longitudinal position and latitudinal position of such person by utilizing global positioning satellites. The system includes an implantable transceiver that is insertable within the person for receiving a positioning signal from a plurality of global positioning satellites, and a mobile receiver for detecting a location signal from the implantable transceiver.

3 Claims, 3 Drawing Sheets

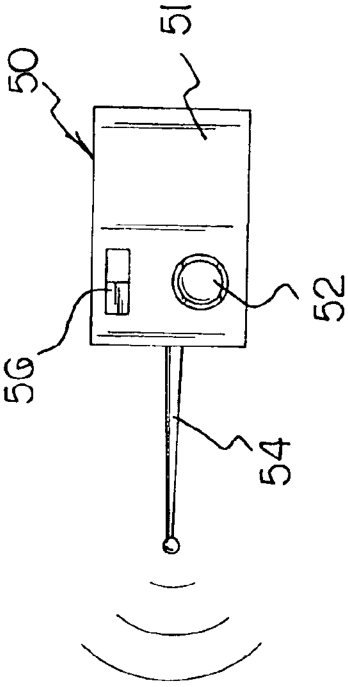
FIG. 1
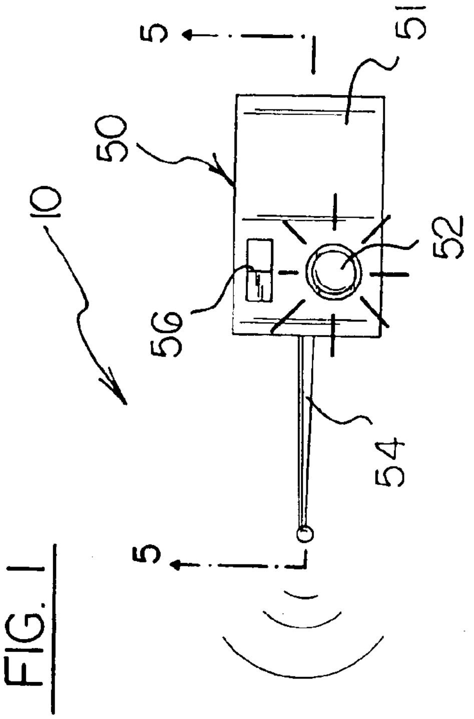
FIG. 2
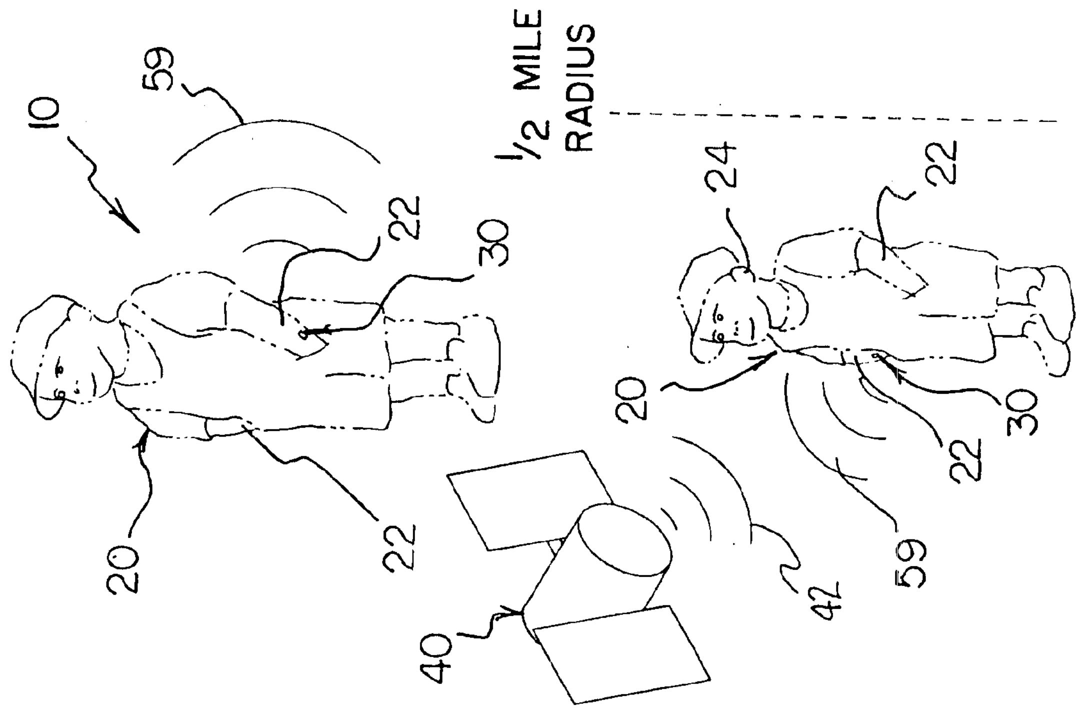

CHILD LOCATING SYSTEM

REFERENCE TO RELATED APPLICATION

This application is a substitute for application Ser. No. 08/662,236, filed Jun. 14, 1996.

BACKGROUND OF THE INVENTION

1. Field of the Invention

The present invention relates to locating systems and more particularly pertains to a new child locating system for detecting if a person, such as a child, is outside of a predetermined radius from a receiving point and for determining the longitudinal and latitudinal position of such person by using global positioning satellites.

2. Description of the Prior Art

The use of locating systems is known in the prior art. More specifically, locating systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,706,689; U.S. Pat. No. 4,793,825; U.S. Pat. No. 4,532,932; U.S. Pat. No. 4,177,800; U.S. Pat. No. 5,217,011 and U.S. Pat. No. 5,074,318.

SUMMARY OF THE INVENTION

The child locating system according to the present invention substantially departs from the conventional concepts and designs of the prior art, and in so doing provides an apparatus primarily developed for the purpose of determining if a person has moved to a location that is greater than a predetermined distance from the a user carrying a mobile receiver.

The present invention includes, generally, an implantable transceiver that is capable of being implanted within the body of a person such that the implantable transceiver is not readily removable from the body. The transceiver comprises receiving means for receiving positioning signals transmitted from a plurality of global positioning satellites, processing means for determining a location of the transceiver based upon the positioning signals, and transmitting means for transmitting a location signal including location information indicting the location of the transceiver. A mobile receiver comprises detecting means for receiving a location signal from the implantable transceiver and indicating means for indicating the location of the implantable transceiver.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

One advantageous feature of the present invention is the ability to determine whether a child is located within a predetermined radius from the user, such as a parent, and thus can be extremely helpful for locating a child that has become lost or has been abducted.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a new implantable transmitting system with an implantable transceiver positioned within an arm of a person and a mobile receiver detecting the signal from the implantable transceiver where the person is within a predetermined distance from the receiver.

FIG. 2 is a perspective view where the person with the implantable transceiver is outside of the one-half mile radius thereby activating the warning light on the mobile receiver.

DESCRIPTION OF THE PREFERRED EMBODIMENT

Figure 3:
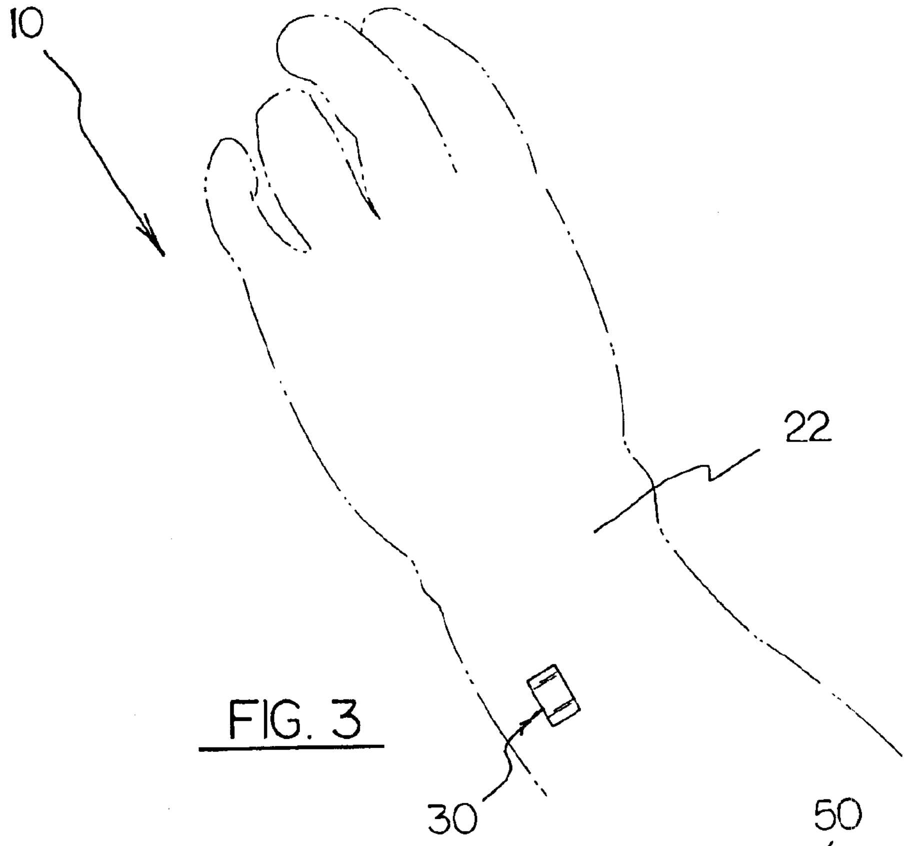
FIG. 3 is a perspective view of the implantable transceiver within a person's arm 22.
Figure 4:
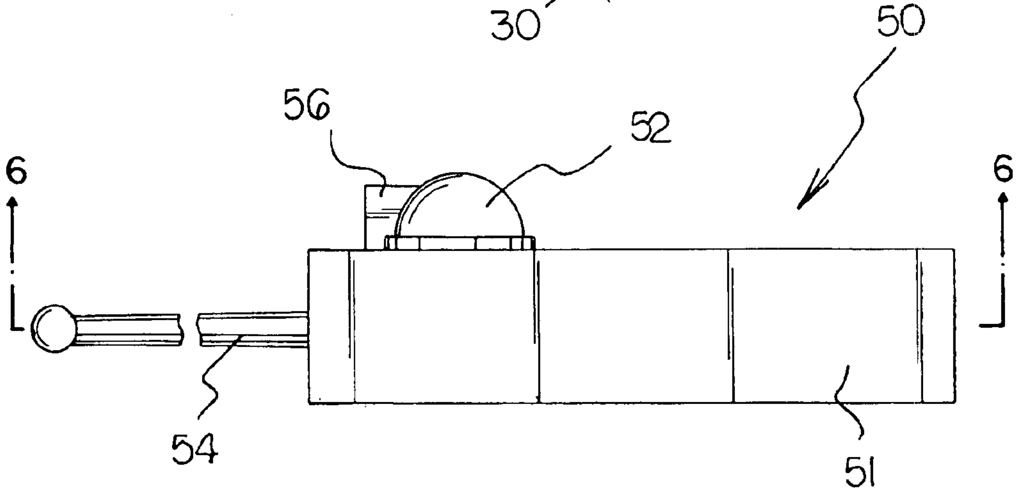
FIG. 4 is a side view of the mobile receiver.
Figure 5:
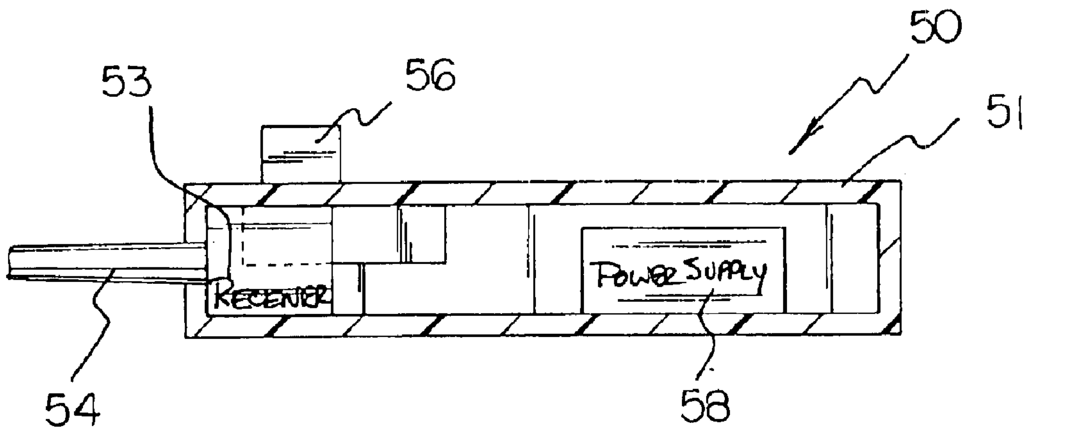
FIG. 5 is a cross sectional view taken along line 5—5 of FIG. 2 displaying the interior of the receiver encasement.
Figure 6:
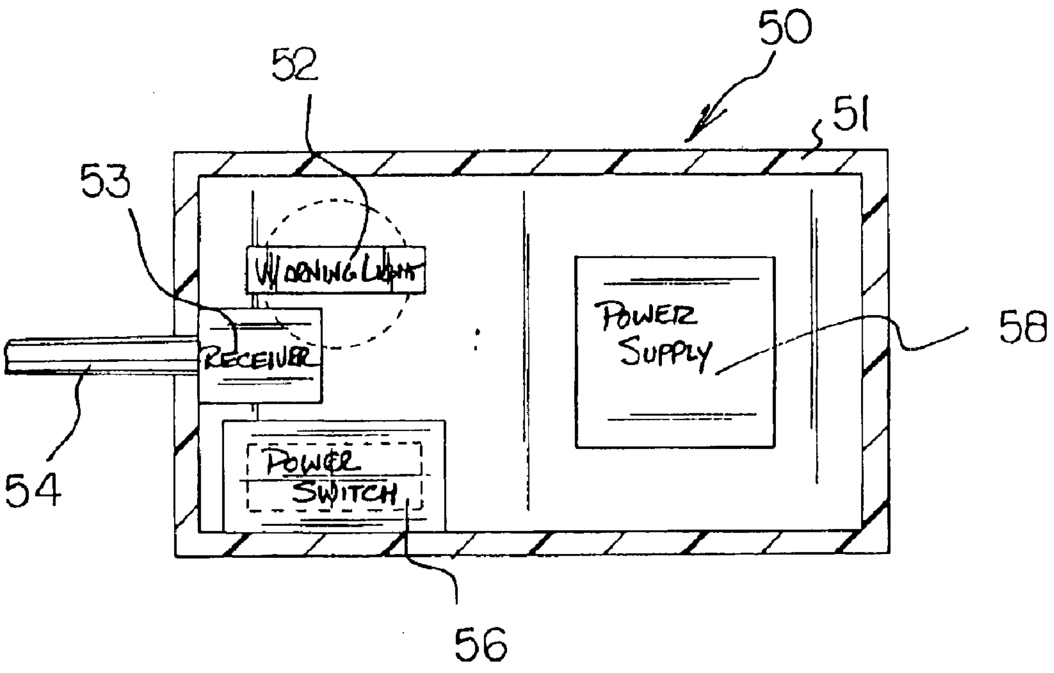
FIG. 6 is a cross sectional view taken along line 6—6 of FIG. 4 displaying the interior of the receiver encasement.

With reference now to the drawings, and in particular to FIGS. 1 through 6 thereof, a new implantable transmitting system embodying the principles and concepts of the present invention and generally designated by the reference numeral 10 will be described.

More specifically, it will be noted that the implantable transmitting system 10 comprises an implantable transceiver 30 that is positionable within a person 20. The implantable transceiver 30 may be implanted in a person whose movements are to be monitored, such as a child, by another person, such as the child's parent.

The implantable transceiver 30 includes receiving means for detecting positioning signals 42 from a plurality of global positioning system (GPS) satellites 40 located in Earth orbit. The transceiver 30 additionally includes processing means for determining a current position of the transceiver (and thus the person in which the transceiver is implanted) based upon the positioning signals 42 received by the receiving means of the transceiver. The implantable transceiver 30 further includes transmitting means for transmitting a location signal 59 indicating the current position of the transceiver (and the person) based upon the positioning signals 42 received from the global positioning satellites 40 by the receiving means.

The system 10 also includes a mobile receiver 50 for carrying by the person (e.g., parent) who wishes to monitor the location of the person 20 having the implanted transceiver. The mobile receiver 50 may have detecting means for detecting and receiving a location signal 59 from the transmitting means of the implantable transceiver. The mobile receiver 50 may also include indicating means for indicating the location of the implantable transceiver based upon the location signal 59. The indicating means may comprises, for example, a display that displays the latitude and longitude of the person 20, an indication of the direction in which the person is located with respect to the location of the mobile receiver, and/or the address of the location of the person 20 if a database of locations in provided to correspond to the latitude and longitude coordinates provided in the location signal.

In greater detail, and as illustrated in FIGS. 1 through 6, it can be seen that the mobile receiver 50 may include a receiver encasement 51. A power supply 58 may be positioned within the receiver encasement 51. A power switch 56 may be electrically connected to the power supply 58. An antenna 54 may be mounted to the exterior of the receiver encasement 51 (see, e.g., FIGS. 1 and 2 of the drawings). An electronic receiver 53 may be electrically connected to the antenna 54. A warning light 52 may be electrically connected to the electronic receiver 53 (see, e.g., FIG. 4 of the drawings).

Preferably, the implantable transceiver 30 may be positioned within the arm 22 of the person 20 (see, e.g., FIG. 3 of the drawings). In an optional embodiment, the implantable transceiver 30 is positioned within the ear 24 of the person 20.

In one highly preferred embodiment of the invention, the mobile receiver 50 is adapted to detect the signal 59 from the implantable transceiver 30 only when the implantable transceiver 30 is located within a predetermined distance from the mobile receiver 50. If the person 20- moves outside an area about the mobile receiver having a radius of the predetermined distance, the warning light may be illuminated. The predetermined distance may be fixed, or, optionally, the predetermined distance may be adjustable to be suitable for the particular situation or conditions in which the system is being used. For example, if the parent and child are moving inside a store or other type of building where relatively less movement is expected, the predetermined distance may be adjusted to a relatively smaller distance (e.g., a matter of yards or meters), and if the parent and child are at a sports event where greater movement is expected, the predetermined distance may be adjusted to a relatively greater distance, such as, for example, a distance of approximately one-half miles from the mobile receiver 50 (see, e.g., FIG. 2 of the drawings).

In use, the implantable transceiver 30 is implanted within the body of the person 20. The mobile receiver 53 receives the signal 59 from the implantable transceiver 30 and does not activate the warning light 52. When the person moves outside the predetermined distance from the mobile receiver 50, the receiver 53 activates the warning light 52 which warns the user (or parent) that the person 20 has moved outside the immediate area defined by the predetermined distance, and may have become lost or have been kidnapped. The user may then contact the authorities or others to help locate the child.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An implantable transmitting system comprising:

an implantable transceiver capable of being implanted within the body of a person such that the implantable transceiver is not readily removable from the body, the transceiver comprising:

receiving means for receiving positioning signals transmitted from a plurality of global positioning satellites;

processing means for determining a location of the transceiver based upon the positioning signals; and transmitting means for transmitting a location signal including location information indicting the location of the transceiver; and a mobile receiver comprising:

detecting means for receiving a location signal from the implantable transceiver; and indicating means for indicating the location of the implantable transceiver.

2. The implantable transmitting system of claim 1, wherein the implantable transceiver is surgically implanted within the person's arm.

3. The implantable transmitting system of claim 1, wherein the implantable transceiver is surgically implanted within the person's ear.

* * * * *